(12) United States Patent
Ji (10) Patent No.: US 7,081,273 B2
(45) Date of Patent: Jul. 25, 2006

(54) METHOD FOR PRODUCING DEFECT FREE COMPOSITE MEMBRANES

(76) Inventor: Jiang Ji, 4 Hawk Dr., Salem, NH (US) 03079

( * ) Notice: Subject to any disclaimer, the term of this patent is extended or adjusted under 35 U.S.C. 154(b) by 0 days.

(21) Appl. No.: 11/214,431

(22) Filed: Aug. 29, 2005

(65) Prior Publication Data

US 2006/0000766 A1  Jan. 5, 2006

Related U.S. Application Data

(62) Division of application No. 10/620,715, filed on Jul. 16, 2003.

(51) Int. Cl.
| B05D 3/00 | (2006.01) |
|---|---|
| A61B 5/03 | (2006.01) |
| B29C 37/00 | (2006.01) |
| B01D 39/00 | (2006.01) |

(52) U.S. Cl. .................. 427/296; 427/246; 427/294; 264/45.1; 264/173.17; 264/173.18

(58) Field of Classification Search ............... 264/41, 264/45.1, 173.13, 173.16–17; 427/245–246, 427/294, 296, 402, 407.1; 210/490, 500.27, 210/536, 500.41–50
See application file for complete search history.

(56) References Cited

U.S. PATENT DOCUMENTS

| 3,676,193 A | * | 7/1972 | Cooper et al. ............... 427/230 |
|---|---|---|---|
| 4,061,821 A | * | 12/1977 | Hayano et al. ............... 428/37 |
| 4,690,766 A | * | 9/1987 | Linder et al. ............... 210/654 |
| 4,810,384 A | * | 3/1989 | Fabre .................... 210/500.23 |
| 5,032,331 A | * | 7/1991 | Onishi et al. ................. 264/48 |
| 5,066,401 A | * | 11/1991 | Muller et al. ........... 210/500.35 |
| 5,282,971 A | * | 2/1994 | Degen et al. ................ 210/645 |
| 5,472,607 A | | 12/1995 | Mailvaganam et al. |
| 5,656,372 A | * | 8/1997 | Gentile et al. ............... 428/376 |
| 5,914,039 A | * | 6/1999 | Mahendran et al. ... 210/500.25 |
| 6,024,872 A | | 2/2000 | Mahendran et al. |
| 6,132,804 A | * | 10/2000 | Rice et al. .................. 427/245 |
| 6,354,444 B1 | | 3/2002 | Mahendran et al. |
| 6,413,070 B1 | * | 7/2002 | Meyering et al. ........... 425/143 |
| 6,536,605 B1 | * | 3/2003 | Rice et al. .................. 210/490 |
| 6,596,167 B1 | * | 7/2003 | Ji et al. .................. 210/500.42 |

\* cited by examiner

*Primary Examiner*—Ana Fortuna
(74) *Attorney, Agent, or Firm*—Jiang Ji (57) ABSTRACT

A defect free semipermeable composite membrane having excellent integrity and high water permeability is provided. Said composite membrane comprises an inside support layer to provide sufficient mechanical strength; an outside barrier layer to provide selective separation; and a middle layer to provide both physical adhesion and chemical binding between said support and said barrier layer to bond them together. Three different methods for making said defect free composite membrane are discovered. These methods have been successfully utilized to produce high quality coatings and defect free composite membranes, which are independent of chemical composition and physical structure of said support. In the present invention, ultrasonic sonication is discovered to be effective to speed up the phase inversion process of a membrane casting solution, thus allows produce a composite membrane at a speed much higher than those disclosed in the prior art. Said defect free composite membranes have broad applications, ranging from filtration of fruit juice, wine and milk to biotech down stream processing and purification of drinking water, municipal and industrial wastewater.

10 Claims, 7 Drawing Sheets

METHOD FOR PRODUCING DEFECT FREE COMPOSITE MEMBRANES

CROSS-REFFERENCE TO RELATED APPLICATIONS

This application is Divisional of U.S. patent application Ser. No. 10/620,715, filed Jul. 16, 2003, which is hereby incorporated by reference in its entirety, and which is the national phase of International Application No. PCT/US2004/022502, filed Jul. 14, 2004, International Publication No. WO 2005/009580 A2, published Feb. 3, 2005

STATEMENT REGARDING FEDERALLY SPONSORED RESEARCH OR DEVELOPMENT

Not Applicable.

BACKGROUND OF THE INVENTION

The present invention relates to the field of semipermeable membranes, which are useful in liquid and gas separation by filtration, dialysis and the like.

An industrial membrane should have a high permeability, sufficient mechanical strength and excellent chemical stability to give a high productivity and a long service time. The membrane chemical stability is mainly determined by chemical composition of membrane materials. Membrane permeability and mechanical strength not only depend on membrane chemical composition, but also strongly depend on membrane physical structure, which is primarily determined by the process utilized to make the membrane.

It is well know that the thinner the membrane, the higher the membrane permeability, however, the thinner the membrane, the weaker the membrane. In order to obtain both high membrane permeability and sufficient mechanical strength, a composite membrane approach has been used. In general, a composite membrane comprises a thin film layer and at least one support layer. The thin film layer (referred to herein as a membrane) provides a separation barrier, which allows minimize flow resistance to increase permeability, and the support provides mechanical strength to a composite membrane.

U.S. Pat. No. 4,061,821 discloses a method of coating a hollow braid with a polyacrylonitrile solution to form a braid-supported hollow fiber membrane, which shows a higher mechanical strength and a higher stability to hot water treatment than the self-supported polyacrylonitrile membrane having no braid support.

In water treatment, a bleach containing sodium hypochlorite as a free chlorine source is often used for membrane cleaning and water disinfections. Polyacrylonitrile based membranes disclosed in U.S. Pat. No. 4,061,821 are not stable to chlorine attack. However, this problem can be overcome by using a polyvinylidene fluoride (PVDF) based membrane, which is relatively stable to free chlorine attack. U.S. Pat. No. 5,472,607 discloses a method of coating a tubular braid with a PVDF solution to form a braid reinforced hollow fiber membrane. The PVDF solution only coats the outside surface of the braid without penetrating into the braid wall. The membranes obtained are stable to 2000 ppm of free chlorine at ambient temperature. Unfortunately, the membranes disclosed in U.S. Pat. No. 5,472,607 have very low water permeability. U.S. Pat. No. 5,914,039 granted to the same group of inventors discloses a method, in which partially hydrolyzed poly(vinyl acetate) and calcined $\alpha$-alumina particles are added to a braid supported PVDF membrane, which shows a higher pure water permeability than the corresponding membrane having no calcined $\alpha$-alumina particles. However, this membrane shows a severe fouling problem in wastewater treatment, because the calcined $\alpha$-alumina particles in the membrane are excellent absorbents, which have very large surface area and a high tendency to absorb impurities from feed solutions to reduce membrane flux. To minimize the membrane fouling problem, the above membrane is operated under frequent back flush, which is often found to cause membrane delaminated, i.e. the membrane is peeled off the braid surface by back flush. A variety of materials, such as polyester, fiberglass and nylon, are used to make a tubular hollow braid. It is found that fiber glass braid shows a more severe membrane delamination problem than polyester and nylon braids due to poor membrane adhesion to the surface of fiber glass braid. U.S. Pat. No. 6,354,444 discloses a physical method to tackle membrane delamination problem, i.e., using different type of braid as a membrane support, which has different braiding patterns, such as regular, hercules and diamond. It is found that the diamond braid having tighter weaves than the regular and hercules braids gives an improved membrane adhesion. However, the membrane delamination problem remains.

In the prior art, the coating quality strongly depends on the braid quality. For example, broken fibers protruding from the surface of tubular braid caused an uneven coating around the broken fibers to form pinholes. According to U.S. Pat. No. 6,354,444, a braid used as a membrane support must have proper weaves. Too open weave causes the filament (fiber) embedded by a polymeric coating material to give a low membrane permeability, and too tight weave causes poor membrane adhesion to the braid surface, the membrane is often found to be peeled off the braid surface by back flush.

Furthermore, the membrane casting solutions in the prior art is unstable and difficult to make to give a poor reproducibility. For example, a hydrophilic component (HPVA) used in a membrane casting solution in U.S. Pat. Nos. 5,472,607, 5,914,039, and 6,354,444 is made by a partial hydrolysis of poly(vinyl acetate). Concentrated sulfuric acid is used as a catalyst, the reaction is carried out over a long time period at an elevated temperature. The degree of hydrolysis is very difficult to control, and varies from batch to batch. U.S. Pat. No. 6,024,872 discloses a method of making a dope containing calcined $\alpha$-alumina particles, which causes an even more severe problem than the partial hydrolysis of poly(vinyl acetate), because the calcined $\alpha$-alumina particles are partially precipitated out of the membrane casting solution during storage, the degree of precipitation varies with time, resulting in a non uniform coating and poor membrane reproducibility.

The highest speed disclosed in the prior art for coating a braid is 40 ft/min, it is relatively low and should be improved for a higher productivity.

The present invention is aimed to solve the problems that were not solved in the prior art.

SUMMARY OF THE INVENTION

It is an object of the present invention to provide a defect free semipermeable composite membrane having its barrier layer strongly bonded to the support.

It is another object of the present invention to provide a method, which can strengthen the binding between the barrier layer and the support of a composite membrane to prevent the membrane from peeling off the support during back flush cleaning.

It is another object of the present invention to provide a spinneret, which has a multiple inlets allowing simultaneously coating a tubular support with multiple layers to give a defect free composite membrane.

It is another object of the present invention to provide an effective coating method to give a high quality coating and a defect free membrane, which is independent of chemical composition and physical structure of the support, especially, independent of braiding patterns, such as regular, hercules and diamond.

It is another object of the present invention to make a stable and reproducible membrane casting solution under a mild condition, which can give a hydrophilic high flux membrane.

It is another object of the present invention to provide a method, which can enhance mass transfer and speed up phase inversion process of a membrane casting solution to produce a composite membrane at a speed higher than those disclosed in the prior art.

A robust composite membrane has been discovered in the present invention, the membrane does not burst or delaminate from support under a back pressure higher than 100 psi because of strong physical adhesion and chemical binding between the membrane and the support. Two different methods have been discovered to provide such a strong binding: (1) adding a permeable adhesive layer between the membrane and the support to bind them together during membrane formation; and (2) applying an adhesive from the support side of a composite membrane after it is formed to bind the membrane and the support together. In contrast to the physical attachment disclosed in the prior art, the two methods discovered in the present invention provide both chemical binding and physical adhesion between the membrane and the support. Therefore the composite membranes discovered in the present invention are stronger than those disclosed in prior art.

According to the present invention, a new type of spinneret is disclosed, which has at least two inlets to provide different coating solutions for simultaneously coating a support with multiple layers to form a defect free composite hollow fiber membrane.

According to the present invention, a method is disclosed for providing a high quality coating on a variety of supports, such as braid, knitted tube, and extruded hollow fiber. In contrast to the prior art, a high quality coating discovered in the present invention is independent of chemical composition and physical structure of support. This is achieved by simultaneously coating a support with multiple layers. The first coating layer not only covers all the defects and roughness of the support, but also provides a smooth surface and strong adhesion for a second coating layer.

According to the present invention, a method is disclosed to make a stable membrane casting solution, which comprises a hydrophobic polymer as a major component, a hydrophilic polymer as a minor component and both inorganic and organic additives as pore formers. The hydrophobic polymer provides the membrane with excellent chemical stability, the hydrophilic polymer provides a hydrophilic surface property and both the inorganic and organic pore formers provide high porosity. In contrast to the prior art, there are no hydrolysis of poly(vinyl acetate) and no calcined α-alumina particles in the present invention, thus the membrane casting solution obtained is very stable during storage. It gives a much better control in coating quality and reproducibility than the prior art. The use of a commercially available hydrophilic polymer in the present invention allows avoid the time consuming hydrolysis reaction disclosed in the prior art, thus to increase productivity and lower production cost.

Furthermore, in the present invention the ultrasonic sonication is utilized in the coagulation bath, primary and secondary leaching baths to enhance mass transfer and to speed up phase inversion process. The use of ultrasonic sonication in the present invention allows produce a composite membrane at a speed higher than those disclosed in the prior art.

BRIEF DESCRIPTION OF THE DRAWINGS

The present invention can be illustrated with the assistance of the following drawings.

DETAILED DESCRIPTION OF THE INVENTION

The present invention has a number of features, which are more advanced than the prior art. These advances are described in details in this section and defined in the appended claims.

Figure 1:
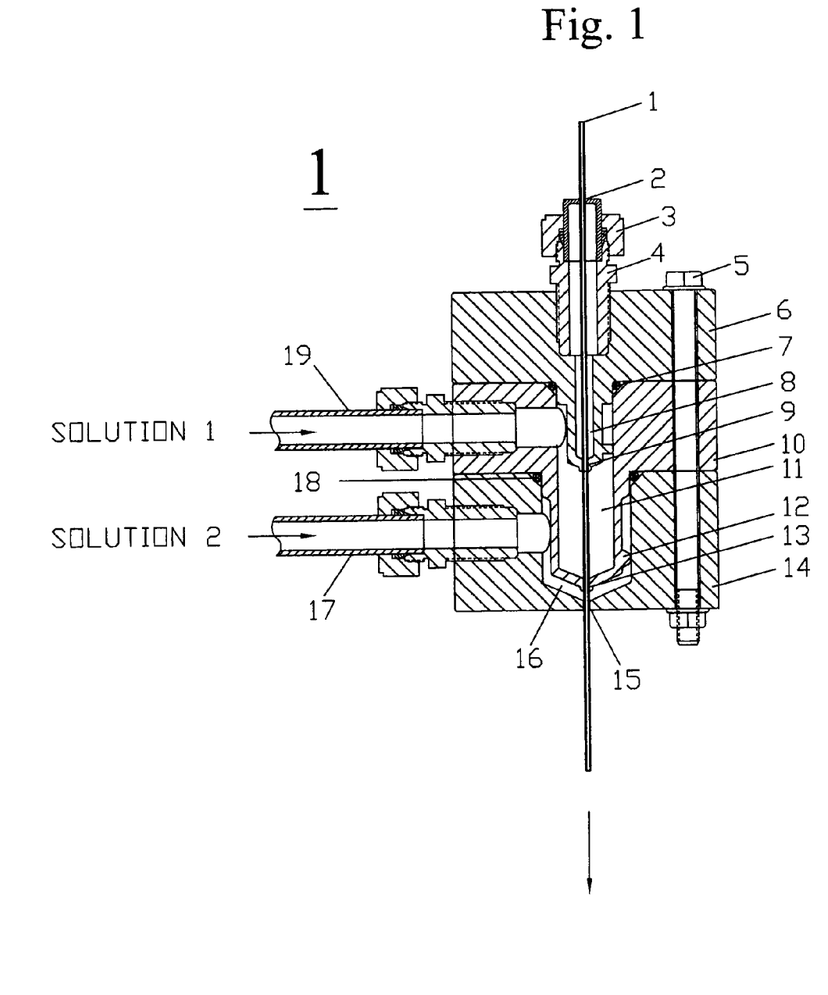
FIG. 1 is the drawing of a new type of spinneret of the present invention.

According to the present invention, a novel composite hollow fiber membrane is obtained by coating a tubular support with multiple layers using a specially designed spinneret 1 as shown in FIG. 1. The spinneret has two inlets 17 and 19, for two different coating solutions. A tubular support 1 enters the spinneret through a small hole 2 located at the top of the spinneret, and hole 9 in the middle. Both holes 2 and 9 play important roles in controlling the tension and alignment of support 1. A tubular support may deform during shipment and storage to give an oval cross section, holes 2 and 9 can make the deformed tubular support restored to its original circular shape. When the support 1 passes through a small hole 9, it is coated with the first coating solution in chamber 11. After passing through another hole 13, the support coated with the first coating solution is subsequently coated with the second solution in chamber 16. The coating thickness is controlled by hole 15. The first coating solution may or may not be the same as the second coating solution depending on desired membrane performance.

Figure 2:
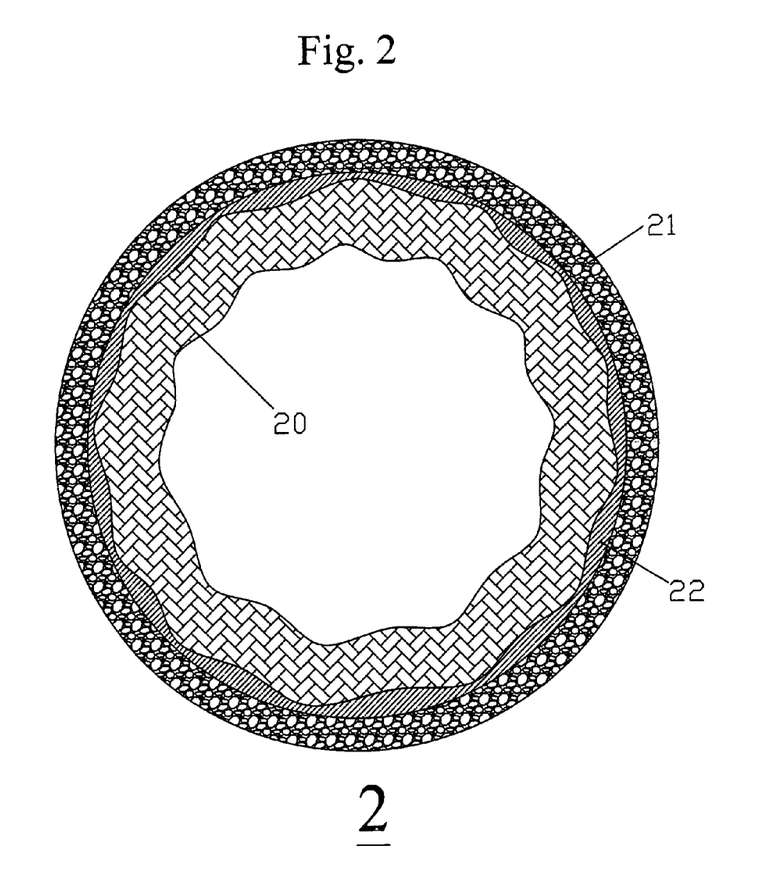
FIG. 2 is the cross section view of a composite hollow fiber membrane of the present invention.

A typical cross section view 2 of a composite membrane obtained in the present invention is schematically shown in FIG. 2. It comprises three different layers. Inside layer 20, represents a porous support, which provides mechanical strength to a composite membrane. Outside layer 21 represents a membrane, which provides a barrier for separation. Middle layer 22 represents a permeable binding layer, which provides binding between the support and the membrane. The beauty of multiple coating layers in the present invention is that the first coating layer not only covers the surface roughness and defects of the support to provide a smooth surface for second coating, but also provides binding between the support and the membrane to bond them together. The first coating layer is very porous, thus has negligible resistance to liquid permeation.

Figure 3:
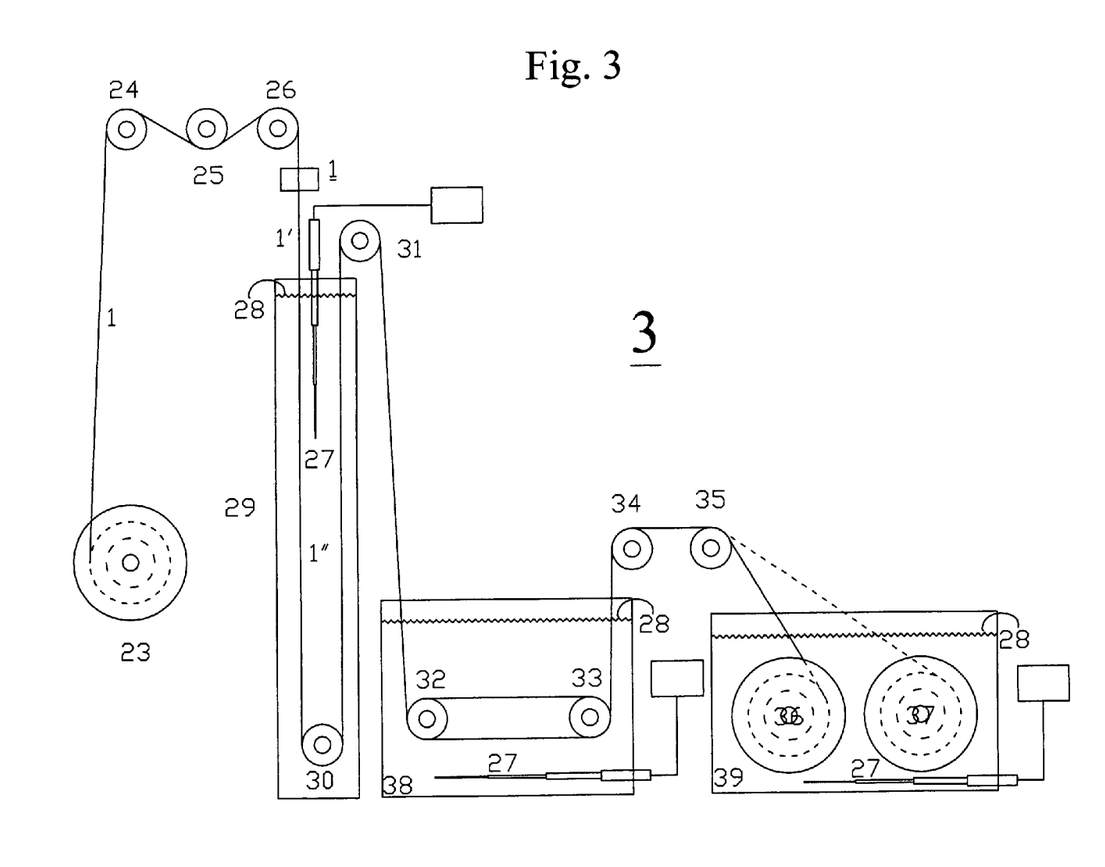
FIG. 3 is the schematic illustration of a novel process for making a composite membrane in the present invention.

A system utilized for coating a tubular support to form a composite hollow fiber membrane is schematically shown in FIG. 3. The fiber coating system comprises a fiber unwound station 23, a set of rollers 24–26, spinneret 1, coagulation bath 29, primary leaching bath 38, secondary leaching bath 39, a set of motorized rollers 30–35, and two fiber take-up wheels 36 and 37, immersed in the secondary leaching bath 39. An ultrasonic sonicator is installed in the coagulation bath 29, it can also be installed in the primary and secondary leaching baths depending on needs. A laser scan micrometer can be installed between roller 34 and 35 to monitor fiber diameter and consistency during membrane formation.

A general process for making a composite hollow fiber membrane is also illustrated in FIG. 3. A tubular support 1 in the present invention is selected from the group consisting of braid, knitted tube, extruded hollow fiber and any other hollow tubular material, which has either smooth or rough surface. A tubular support 1 from spool 23 is guided through a set of rollers 24–26, which control tension prior to coating. A tubular support 1 is coated by two polymer solutions when passing through spinneret 1. A detail illustration of coating process inside the spinneret is given in FIG. 1. When the support 1 passes through a small hole 9, it is coated in chamber 11 by the first coating solution, which is selected from the group consisting of epoxy, polyurethane, silicone, other adhesives and other polymer solutions, which have excellent compatibility with both the braid and membrane to bond them together. In Example 1, the first coating solution is the same as the second coating solution. In Example 2, the first coating solution is a proprietary adhesive specially formulated for strengthening the binding between the membrane and the support. The adhesive layer covers all the defects of the tubular support. The first coating provides a smooth surface and strong binding for the second coating layer. After passing through hole 13, the adhesive coated braid is subsequently coated with the second coating solution in chamber 16 of spinneret 1. In Examples 1–4 of the present invention, the second coating solution contains a fluoropolymer as a major component and a hydrophilic polymer as a minor component. The coating thickness is controlled by hole 15. The polymer coated braid is allowed travel a very short distance, such as 4 inches, in air before entering coagulation bath 29, where polymer phase inversion from liquid to solid takes place to form a composite hollow fiber membrane. An ultrasonic device 27, which can generate ultrasonic vibration, is installed in coagulation bath 29 to enhance mass transfer between the coagulation media and newly formed membrane to efficiently remove solvent and additives from the membrane. The solidified membrane is transferred from coagulation bath 29 into a primary leaching bath 38 via a roller 31 above gelation bath 29. The primary leaching bath 38 has two motorized rollers 32 and 33. The fiber is wrapped two dozen times around two parallel rollers 32 and 33 to leach the residual solvent and additives out of the membrane. Then, the fiber is allowed pass over roller 34 and 35 and is finally collected by a take-up wheel immersed in water in a secondary leaching tank 39, the remaining chemical residuals are removed from the membrane at this stage. A laser scan micrometer can be installed between roller 34 and 35 to monitor fiber size and consistency. The signal obtained from the laser scan micrometer can be sent back to the dope delivery system to control dope delivery rate. Ultrasonic device can be installed in both the primary and the secondary leaching bath 38 and 39, respectively. The ultrasonic device installed in the coagulation bath 29 has significantly enhanced mass transfer and speeded up the phase inversion from liquid to solid during membrane formation. Thus, a composite hollow fiber membrane in the present invention has been produced at a speed much faster than those disclosed in the prior art.

Example 1 illustrates a basic process for making a braid supported hollow fiber membrane in the present invention.

A membrane casting solution (referred to herein as Dope I) is made by dissolving 13 parts by weight of PVDF, 5 parts by weight of polyvinylpyrrolidone (PVP), 5 parts by weight of aluminum chloride hexahydrate ($AlCl_3.6H_2O$), and 2 parts by weight of poly(vinyl butyral-co-vinyl alcohol-vinyl acetate) in 75 parts by weight of 1-methyl-2-pyrrolidinone (NMP) as a solvent.

A composite hollow fiber membrane is prepared by coating a braid twice with Dope I using a process shown in FIG. 3. A braid used as a membrane support has a tubular geometry and a curved surface, its cross section 20 is schematically shown in FIG. 2. The first coating layer 22 covers the rough surface of braid and provides a smooth surface for a second coating as displayed in FIG. 2. The second coating layer 21 seals any defect that the braid may still have after the first coating to form a defect free composite membrane as shown in FIG. 2.

In Example 1, ultrasonic sonication is applied to the coagulation bath to enhance mass transfer and to speed up phase inversion process. A composite hollow fiber membrane is produced at a speed of 60 ft/min. A composite membrane obtained has an outside diameter of 78 mil, a water permeability of 50 gfd/psi measured at 10 psi transmembrane pressure.

The membrane burst pressure is defined as the pressure at which the membrane is ruptured. This parameter is very important, because the membrane is often cleaned by back flush, the membrane may delaminate (i.e., peel off) from the support if the membrane burst pressure is lower than the pressure applied for back flush cleaning. The composite hollow fiber membrane obtained from Example 1 has a burst pressure of 40 psi, it is not very high, but sufficient for most of filtration applications.

Figure 4:
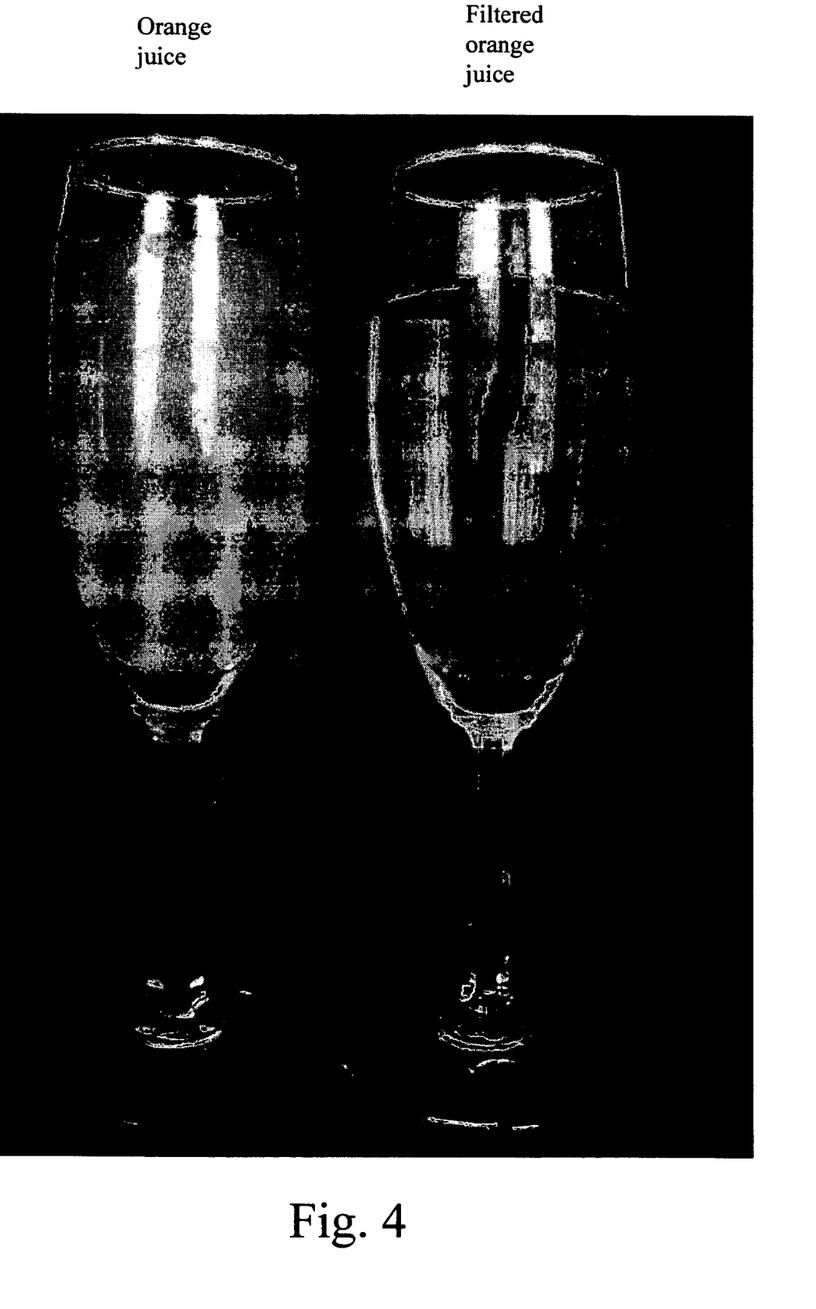
FIG. 4 is the filtered and concentrated orange juice.
Figure 5:
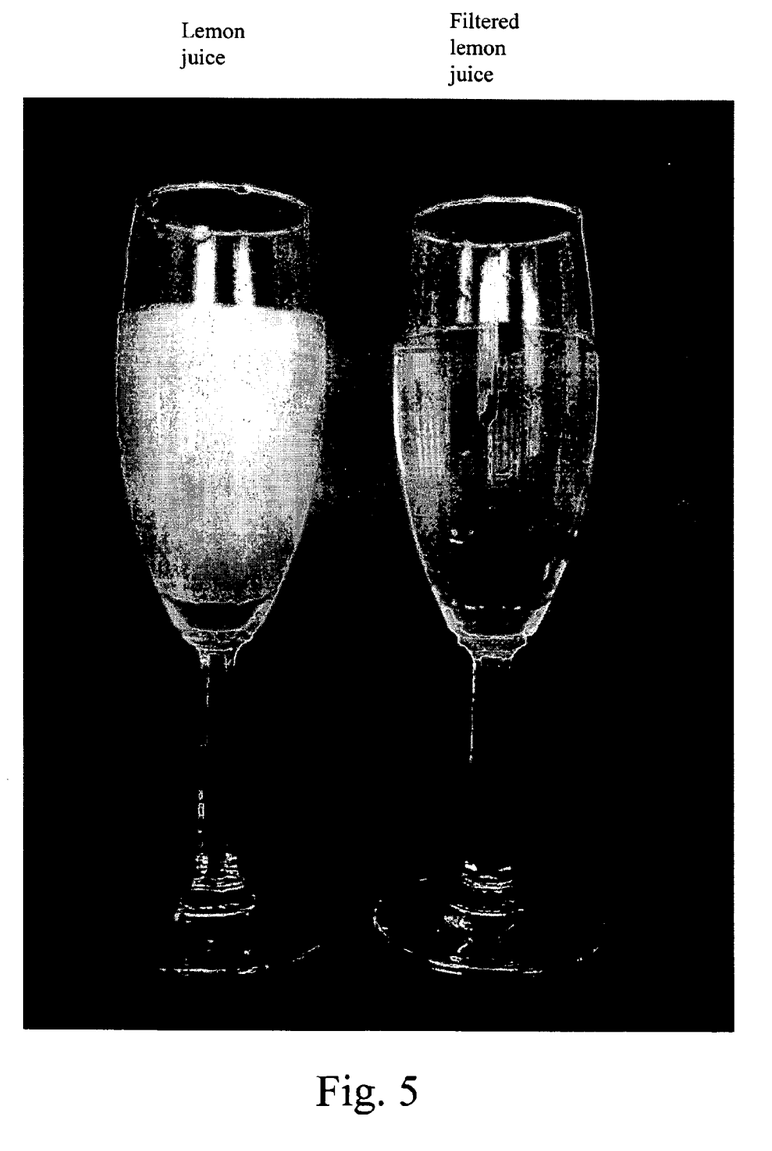
FIG. 5 is the filtered and concentrated lemon juice.

The membrane obtained from Example 1 is useful for a variety of applications, such as water purification and filtration of wine, juice and milk. The 100% orange juice containing suspended particles, which is sold in a local supermarket under a brand name of Tropicana Pure Premium, is filtered by the membrane obtained from Example 1 to give a yellow retentate (concentrate) and clear filtrate (permeate) as shown in FIG. 4, the filtrate is full of aroma and less sweet than the original 100% juice to become a delicious diet orange juice. A similar result is obtained from filtering concentrated lemon juice containing suspended particles to give a clear permeate and white cloudy concentrate as shown in FIG. 5, the filtrate is a delicious diet lemon juice.

Figure 6:
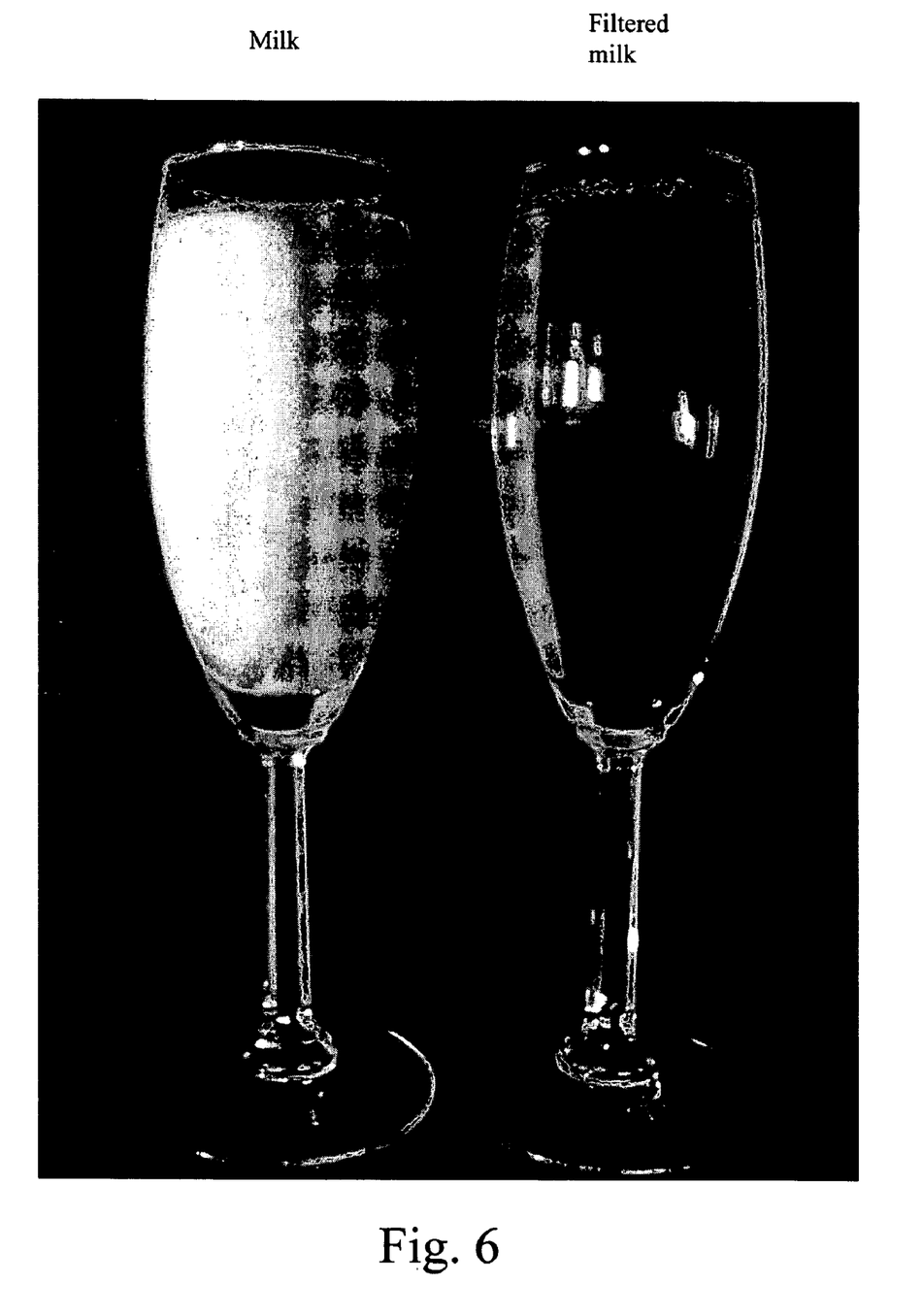
FIG. 6 is the filtered and concentrated milk.
Figure 7:
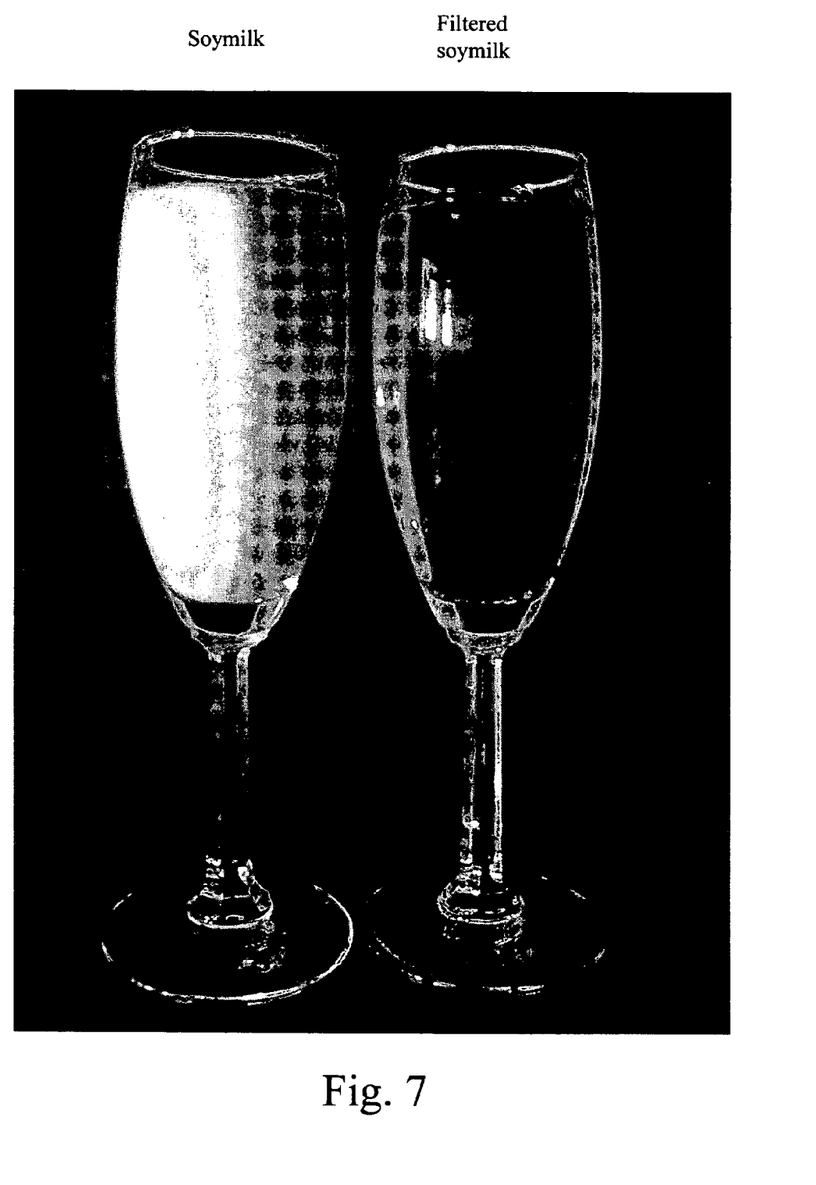
FIG. 7 is the filtered and concentrated soymilk.

The membrane obtained from Example 1 has been utilized for concentration of milk and soymilk. Whole milk obtained from a local supermarket is filtered to give a clear permeate as shown in FIG. 6, the concentrated milk obtained can be used to make cheese and other dairy products. A similar result is obtained when filtering soymilk sold in a local supermarket under a brand name of Silk, the filtrate obtained is a light yellow clear solution, the retentate obtained is a white milky solution as shown in FIG. 7.

The surface water obtained from Canobie Lake, Salem, N.H., is filtered with the membrane obtained from Example 1 to give potable water, which is as clear as a purified bottled water purchased from a local supermarket. The unfiltered Canobie Lake water is darker than both the filtered water and the bottled water because the lake water contains suspended particles and other soluble impurities. For comparison, the inventor drinks a glass of filtered Canobie Lake water and a glass of pure water purchased from a local supermarket, no difference in taste is detected.

Sewage water obtained from a local sewer system, which has a black color and stinky smell, is filtered with the membrane obtained from Example 1. The filtered sewage water is as clear as the drinking water, has no odor and is dischargeable.

The membrane obtained from Example 1 is further utilized to filter white and red wine. In order to mimic unfiltered wine, green grape and Italian white wine, BELLA SERA PINOT GRIGIO, was blended together with a kitchen blender to give a wine mixture containing suspended grape particles. The wine mixture is filtered with membrane to give a white wine permeability of 26.3 gfd/psi and a filtered sparkling white wine which looks identical to the bottled wine, the suspended grape particles are completely removed from the wine by membrane filtration.

Similarly, red grape and French red wine, BARTON & GUESTIER MERLOT, are blended together with a kitchen blender to give a red wine mixture containing grape particles. After membrane filtration, sparkling red wine is obtained and looks identical to the bottled wine, indicating that the membrane has a right pore size to let red pigment of the red wine freely passing through the membrane while removing the suspended grape particles.

A post treatment is carried out by immersing the membrane obtained from Example 1 in an aqueous solution containing 10,000 ppm sodium hypochlorite at ambient temperature for 48 hours. After this post treatment, pure water permeability is increased from 50 to 141 gfd/psi, Canobie Lake water permeability increased from 32 to 38 gfd/psi, and sewage water permeability increased from 11 to 19 gfd/psi. No difference in permeate quality is detected compared to those obtained from the untreated membrane.

Example 2 illustrates an impact of adding an adhesive layer between the support and the membrane on membrane performance, in particular on membrane burst pressure, which is a critical parameter to evaluate membrane integrity.

In Example 2, a braid is first coated with a proprietary adhesive specially formulated for strengthening binding between the braid and the membrane, then coated with Dope I obtained from Example 1 using a spinneret shown in FIG. 1 and a process depicted in FIG. 3 to give a composite hollow fiber membrane which has three different layers as schematically shown in FIG. 2. The inside thick layer 20 represents the braid, the middle thin layer 22 represents the adhesive, and the outside layer 21 represents the membrane. The membrane obtained is treated at 80° C. for 8 hours to give a burst pressure of 82 psi, which is about twice as high as that of the membrane (control) obtained from Example 1. Compared to the control obtained from Example 1, adding an adhesive layer between the braid and the membrane resulted in a lower water permeability of 17 gfd/psi.

A post treatment with 10,000 ppm sodium hypochlorite aqueous solution at ambient temperature increases the water permeability from 17 to 42 gfd/psi. This chlorine treated membrane is utilized to filter surface water from Canobie Lake to give clean potable water. The adhesive reinforced membrane is also used to filter sewage water to give a sewage water permeability of 8 gfd/psi, the filtered sewage water is as clear as drinking water and is dischargeable.

The beauty of adding an adhesive layer between the support and the membrane is that the adhesive layer not only covers the defects and roughness at braid surface as shown in FIG. 2 to provide a smooth surface for the second coating, but also strengthens the binding between the support and the membrane.

An alternative approach to strengthen the binding between the membrane and the support is illustrated in Example 3.

The composite hollow fiber membrane obtained from Example 1 is filled with a proprietary adhesive for a short time period to impregnate the braid and the membrane from inside. The excess amount of adhesive is removed from the membrane. The membrane impregnated with adhesive is heated at 80° C. for 8 hours. The composite membrane obtained from Example 3 has an outside diameter of 78 mil. The adhesive reinforced membrane does not rupture when applying 100 psi pressure from the inside of membrane, indicating that the membrane has a burst pressure at least 100 psi which is much higher than that of the control obtained from Example 1. Consequently, the water permeability is reduced from 50 to 20 gfd/psi compared to the control.

A post treatment with 10,000 ppm sodium hypochlorite aqueous solution at ambient temperature for 48 hours increases pure water permeability from 20 to 55 gfd/psi. This chlorine treated membrane is used to filter Canobie Lake water to give clear potable water with a permeability of 22 gfd/psi. The chlorine treated membrane is also used to filter sewage water to give clean dischargeable water with a permeability of 12 gfd/psi.

Example 4 further illustrates the impact of multiple layer coating on membrane performance using a dope containing poly(vinylidene fluoride-co-hexafluropropylene) (PVDF-HPF). PVDF-HFP is more stable than PVDF.

In Example 4, a membrane casting solution (Dope II) is made by dissolving 14 parts by weight of PVDF-HPF, 5 parts by weight of PVP, 5 parts by weight of aluminum chloride hexahydrate ($AlCl_3.6H_2O$), and 2 parts by weight of poly(acrylonitrile-co-vinylidene chloride-co-methylmethacrylate) in 74 parts by weight of NMP as a solvent. A composite hollow fiber membrane is prepared using a spinneret shown in FIG. 1 and a process depicted in FIG. 3. The first coating covers surface roughness to provide a smooth surface for a second coating; while the second coating seals any defect, that the braid may still have after the first coating, to give a defect free membrane.

A composite membrane obtained from Example 4 has an outside diameter of 78 mil, a burst pressure of 36 psi, a water permeability of 26 gfd/psi measured at 10 psi transmembrane pressure, and a rejection of 90% towards poly(ethylene oxide) molecular weight marker having an average molecular weight of 200 kD. The membrane shows excellent performance in filtration of orange and lemon juice and in concentration of milk and soymilk, the details are given in Table 4 of the present invention.

A post treatment with 10,000 ppm sodium hypochlorite aqueous solution at ambient temperature increases the water permeability from 26 to 51 gfd/psi. This chlorine treated membrane is utilized to filter surface water from Canobie Lake to give clean potable water with a permeability of 27 gfd/psi. The chlorine treated membrane is also used to filter sewage water to give clean dischargeable water with a permeability of 10 gfd/psi.

The beauty of simultaneously coating the support twice with the same dope is to completely eliminate the defect from the membrane without adding extra cost to manufacturing process compared to a single layer coated membrane disclosed in the prior art.

The use of a commercially available poly(vinyl butyral-co-vinyl alcohol-vinyl acetate) in the present invention to provide hydrophilicity to the membrane allows avoid the time consuming hydrolysis reaction of poly(vinyl acetate) in the prior art. The use of aluminum chloride hexahydrate and polyvinylpyrrolidone in the present invention to provide the membrane with high porosity allows avoid the dope instability problem caused by precipitation of calcined α-alumina particles in the prior art. The use of ultrasonic sonication in the present invention to speed up phase inversion of a membrane coating solution from liquid to solid allows produce a composite hollow fiber membrane at a speed higher than those disclosed in the prior art. The use of multiple-layer coating method in the present invention allows produce a strong, durable and defect free composite membrane. Therefore, the present invention produces more superior composite membranes and provides more advanced processes for making said composite hollow fiber membranes than the prior art.

The following examples illustrate the present invention in details and are not intended to limit the same.

EXAMPLE 1

Effect of Multiple Coatings on Membrane Performance

All of the chemicals used were purchased from Aldrich Chemicals Inc., Milwaukee, Wis. 53201.

A membrane casting solution (referred to herein as Dope I) was prepared by dissolving 13 parts by weight of poly(vinylidene fluoride) (PVDF), 5 parts by weight of polyvinylpyrrolidone (PVP), 5 parts by weight of aluminum chloride hexahydrate ($AlCl_3 \cdot 6H_2O$), and 2 parts by weight of poly(vinyl butyral-co-vinyl alcohol-vinyl acetate) in 75 parts by weight of 1-methyl-2-pyrrolidinone (NMP) as a solvent.

A composite hollow fiber membrane was prepared by coating a tubular braid with the above dope using a spinneret shown in FIG. 1 and a process depicted in FIG. 3. Ultrasonic sonication was applied to the coagulation bath to speed up phase inversion process. The braid was coated at a speed of 60 ft/min, coagulated and leached at 50–55° C. in water to give a composite hollow fiber membrane, which was collected by a take-up wheel immersed in water at ambient temperature.

The membrane obtained above was characterized by measuring its diameter, burst pressure, water permeability, and by filtration of wine, milk, soymilk, orange juice, lemon juice, surface water, and sewage water. All filtration tests were conducted at ambient temperature, 10 psi transmembrane pressure, a liquid was allowed to flow from outside the hollow fiber membrane into its lumen to give a permeate. The orange juice, lemon juice, milk and soymilk were purchased from a local supermarket. The surface water was obtained from Canobie Lake, Salem, N.H. Sewage water was obtained from a local septic in Salem, N.H. The results obtained are summarized in Table 1.

TABLE 1

| COMPOSITION OF MEMBRANE CASTING SOLUTION (DOPE I) | |
|---|---|
| Poly(vinylidene fluoride) (PVDF) | 13% |
| Polyvinylpyrrolidone (PVP) | 5% |
| Aluminum chloride hexahydrate ($AlCl_3 \cdot 6H_2O$) | 5% |
| Poly(vinyl butyral-co-vinyl alcohol-vinyl acetate) | 2% |
| 1-Methyl-2-pyrrolidinone (NMP) | 75% |

| COATING CONDITION | |
|---|---|
| Dope Pressure | 80 psi |
| $1^{st}$ coating | Dope I |
| $2^{ed}$ coating | Dope I |
| Coagulation bath | Water, 50–55° C. |
| Primary leaching bath | Water, 50–55° C. |
| Secondary leaching bath | Water, ambient temperature |
| Coating speed | 60 ft/min |

| MEMBRANE CHARACTERISTICS | |
|---|---|
| Braid outside diameter | 63 mil |
| Membrane outside diameter | 78 mil |
| Burst pressure | 40 psi |
| Pure water permeability | 50 gfd/psi |
| Canobie Lake water permeability | 32 gfd/psi, permeate clear and potable |
| Sewage water permeability | 11 gfd/psi, permeate clear and dischargeable |
| Italian white wine: BELLA SERA | 26.3 gfd/psi, permeate sparkling white wine |
| French red wine: B & G MERLOT | 7.9 gfd/psi, permeate sparkling red wine |
| Lemon juice permeability | 1.1 gfd/psi, permeate clear |
| Orange juice permeability | 0.88 gfd/psi, permeate clear, bright yellow |
| Soymilk permeability | 0.79 gfd/psi, permeate clear, light yellow |
| Milk permeability | 0.77 gfd/psi, permeate clear |

| POST TREATMENT WITH 10,000 PPM NaOCl AT AMBIENT TEMPERATURE FOR 48 HOURS | |
|---|---|
| Water permeability | 141 gfd/psi |
| Canobie lake water permeability | 38 gfd/psi, permeate clear and potable |
| Sewage water permeability | 19 gfd/psi, permeate clear and dischargeable |

EXAMPLE 2

Effect of an Adhesive Coating Layer on Membrane Performance

In example 2, a braid was first coated with a proprietary adhesive, then coated with Dope I obtained from Example 1 using a spinneret displayed in FIG. 1 and a process depicted in FIG. 3 to give a composite hollow fiber membrane. The membrane was heated in an oven at 80° C. for 8 hours before use. The condition used to make the membrane and membrane characteristics are given in Table 2.

TABLE 2

| COMPOSITION OF MEMBRANE CASTING SOLUTION (DOPE I) | |
|---|---|
| Poly(vinylidene fluoride) (PVDF) | 13% |
| Polyvinylpyrrolidone (PVP) | 5% |
| Aluminum chloride hexahydrate ($AlCl_3 \cdot 6H_2O$) | 5% |
| Poly(vinyl butyral-co-vinyl alcohol-vinyl acetate) | 2% |

TABLE 2-continued

| | |
|---|---|
| 1-Methyl-2-pyrrolidinone (NMP) | 75% |
| COATING CONDITION | |
| Dope Pressure | 100 psi |
| 1st coating | Adhesive |
| 2ed coating | Dope I |
| Coagulation bath | Water, 50–55° C. |
| Primary leaching bath | Water, 50–55° C. |
| Secondary leaching bath | Water, ambient temperature |
| Coating speed | 60 ft/min |
| MEMBRANE CHARACTERISTICS | |
| Braid outside diameter | 63 mil |
| Membrane outside diameter | 78 mil |
| Burst pressure | 82 psi |
| Water permeability | 17 gfd/psi |
| Milk permeability | 1.2 gfd/psi |
| POST TREATMENT WITH 10,000 PPM NaOCl AT AMBIENT TEMPERATURE FOR 48 HOURS | |
| Water permeability | 42 gfd/psi |
| Canobie lake water permeability | 18 gfd/psi, permeate clear and potable |
| Sewage water permeability | 8 gfd/psi, permeate clear and dischargeable |

EXAMPLE 3

Effect of Adhesive Reinforcement on Membrane Performance

The composite hollow fiber membrane obtained from Example 1 was first filled with a proprietary adhesive formulated for strengthening the binding between the support and the membrane, then drained to remove the excess amount of adhesive from the membrane. The membrane was heated in an oven at 80° C. for 8 hours before use. The membrane obtained has the following characteristics as shown in Table 3.

TABLE 3

| MEMBRANE CHARACTERISTICS | |
|---|---|
| Braid outside diameter | 63 mil |
| Membrane outside diameter | 78 mil |
| Burst pressure | >100 psi |
| Water permeability | 20 gfd/psi |
| Milk permeability | 1.2 gfd/psi, permeate clear |
| POST TREATMENT WITH 10,000 PPM NaOCl AT AMBIENT TEMPERATURE FOR 48 HOURS | |
| Water permeability | 55 gfd/psi |
| Canobie Lake water permeability | 22 gfd/psi, permeate clear and potable |
| Sewage water permeability | 12 gfd/psi, permeate clear and dischargeable |

EXAMPLE 4

Effect of Multiple Coating Layers on Membrane Performance

A membrane casting solution (Dope II) was prepared by dissolving 14parts by weight of PVDF-HFP, 5 parts by weight of PVP, 5 parts by weight of aluminum chloride hexahydrate, and 2 parts by weight of Poly(acrylonitrile-co-vinylidene chloride-co-methylmethacrylate) in 74 parts by weight of NMP as a solvent. A composite hollow fiber membrane was prepared by first coating a tubular braid with Dope II, followed by coating with Dope II again using a spinneret shown in FIG. 1 and a process depicted in FIG. 3. The ultrasonic sonication was applied to the coagulation bath, primary and secondary leaching baths to speed up phase inversion process. The condition used to prepare a composite hollow fiber membrane is given in Table 4. The membrane obtained was characterized in the same way as in Example 1, and the results obtained are summarized in Table 4.

TABLE 4

| COMPOSITION OF MEMBRANE CASTING SOLUTION (Dope II) | |
|---|---|
| Poly(vinylidene fluoride-co-hexafluropropylene) (PVDF-HFP) | 14% |
| Polyvinylpyrrolidone (PVP) | 5% |
| Aluminum chloride hexahydrate (AlCl$_3$.6H$_2$O) | 5% |
| Poly(acrylonitrile-co-vinylidene chloride-co-methylmethacrylate) | 2% |
| 1-Methyl-2-pyrrolidinone (NMP) | 74% |
| COATING CONDITION | |
| Dope Pressure | 100 psi |
| 1st coating | Dope II |
| 2ed coating | Dope II |
| Coagulation bath | Water, 50–55° C. |
| Primary leaching bath | Water, 50–55° C. |
| Secondary leaching bath | Water, ambient temperature |
| Coating speed | 100 ft/min |
| MEMBRANE CHARACTERISTICS | |
| Braid outside diameter | 63 mil |
| Membrane outside diameter | 78 mil |
| Burst pressure | 36 psi |
| 200 kD PEO rejection | 90.0% |
| Water permeability | 26 gfd/psi |
| Lemon juice permeability | 0.96 gfd/psi, permeate clear |
| Orange juice permeability | 0.81 gfd/psi, permeate clear, bright yellow |
| Soymilk permeability | 0.69 gfd/psi, permeate clear, light yellow |
| Milk permeability | 0.72 gfd/psi, permeate clear |
| POST TREATMENT WITH 10,000 PPM NaOCl AT AMBIENT TEMPERATURE FOR 48 HOURS | |
| Water permeability | 51 gfd/psi |
| Canobie Lake water permeability | 27 gfd/psi, permeate clean and potable |
| Sewage water permeability | 10 gfd/psi, permeate clean and dischargeable |

Although the composite hollow fiber membranes are used to illustrate the present invention, the formulations, methods and processes discovered in the present invention are applicable to flat sheet composite membranes, large diameter tubular composite membranes and any other composite membrane having a different geometry.

I claim:

1. A method for producing a defect free composite membrane comprising:
   (i) preparing a solution A comprising a chemical, which are selected from the group consisting of epoxy, polyurethane, silicone, adhesives, monomers, polymers, and combinations thereof;
   (ii) preparing a solution B comprising 8–60% of a hydrophobic polymer, 1–20% of a hydrophilic polymer, 1–20% of inorganic additive, 1–10% of monomers, 1–10% of organic additives, and solvents;
(iii) providing a support;
(iv) coating said support at a speed from 5 to 3,000 ft/min with solution A and solution B simultaneously using a spinneret;
wherein the support is first contacted with said solution A to form a first layer on said support, and said first layer is coated with solution B to form a second layer on top of the first layer;
(v) applying vacuum to the support either prior or during coating;
(vi) coagulating said coating layers on top of said support in a coagulation bath stirred with an ultrasonic device to form a defect free composite membrane;
(vii) removing said solvent and additives from said membrane in a series of leaching baths stirred with submersible ultrasonic cleaner;
(viii) controlling and monitoring coating thickness and consistency by a laser sensor and feeding a signal back to a solution delivery system to give a desired membrane thickness;
(ix) collecting said membrane at a speed of 5 to 3,000 ft/min with a take-up wheel immersed in a water bath agitated with an ultrasonic sonicator to remove chemical residual from said membrane;
(x) switching to another take-up wheel when one wheel is full to continue collecting said membrane around clock;
(xi) curing said membrane either at ambient temperature or at an elevated temperature depending on the chemical compound used in solution A to bond said support and said membrane together.

2. The method of claim 1, wherein said method has an optional post treatment of said composite membrane, depending on a desired membrane performance, with ozone or a solution containing 100–120,000 ppm free chlorine at ambient or elevated temperature to increase membrane water permeability by 2 to 10 folds compared to a virgin membrane never exposed to any chlorine treatment.

3. The method of claim 1, wherein said method produces high quality coatings and defect free membranes, which are independent of chemical composition and physical structure of said support selected from the group consisting of flat sheet, hollow fiber, tube.

4. The method of claim 1, wherein said spinneret has multiple inlets, one inlet at the top for a support, one inlet near the top for applying the vacuum to said support, one inlet in the middle of e spinneret for said coating solution A, another inlet also in the middle for said coating solution B, and an additional inlet near the bottom fro applying another protective layer to said defect free composite membrane.

5. The method of claim 1, wherein said hydrophobic polymers are selected from the group consisting of poly (copper phthalocyanine), poly(cyclohexyl methacrylate), poly(diallyl isophthalate), poly, poly(1-hexe-sulfone), poly (melamine-co-formaldehyde) methylated, polyamide, polysulfonamide, poly(styrene-co-acrylonitrile), poly(styrene-co-maleic anhydride) partial 2-butoxyethyle ester cumene terminated, poly(trimetllitic anhydride chloride-co-4,4'-methylene dianiline), poly(vinyl chloride), poly(vinylidene chloride-co-vinyl chloride), poly(vinylidene chloride-co-methyl acrylate), poly(vinylidene chloride-co-acrylonitrile-co-methylmethacrylate), poly(vinylidene chloride-co-acrylonitrile), poly(vinylidene fluoride), poly (vinylidene fluoride-co-haxefluropropylene), polysulfone, polyethersulfone, polyetherketone, polyacrylonitrile, polystyrene, poly(acrylonitrile-co-butadiene-co-styrene), poly (bisphenol A-co-4-nitrophthalic anhydride-co-1,3-phenylenediamine), polycarbonate, and combinations thereof.

6. The method of claim 1, wherein said hydrophilic polymers are selected from the group consisting of poly (anetholesulfonic acid, sodium salt), polyaniline (emeraldine salt), 80% ethoxylated polyethylenimine, polyethylenimine, poly(2-isopropenyl-2-oxazoline-co-methyl methacrylate), acrylated poly(melamine-co-formaldehyde), poly(4-hydroxy-2,2,6,6-tetramethyl-1-piperidine ethanolalt-1,4-butanedioic acid), poly(vinyl chloride-co-vinyl acetate-co-vinyl alcohol), poly(vinyl chloride-co-vinyl acetate-co-maleic acid), poly(pyromellitic dianhydride-co-4,4'-oxydianiline), poly(sodium-4-styrenesulfonate), poly (styrenesulfonate)/poly(2,3-dihydrothieno(3,4-b)-1,4-dioxin), poly(vinyl acetate-co-vinyl alcohol), poly(vinyl butyral-co-vinyl alcohol-co-vinyl acetate), poly(vinyl alcohol-co-ethylene), poly(vinyl alcohol-co-vinyl acetate-co-itaconic acid), poly(vinyl alcohol), poly(ethylene oxide), poly (ethylene glycol), poly(vinyl acetate-co-crotonic acid), poly (1-vinylpyrrolidone-co-vinyl acetate), sulfonated polysulfone, cellulose, cellulose acetate, nitrocellulose, polyvinylpyrrolidone, poly(vinylpyrrolidone) iodine complex, crosslinked polyvinylpyrrolidone nanoparticles, crosslinked polyvinylpyrrolidone microparticles, crosslinked polyacrylonitrile nanoparticles, crosslinked polyacrylonitrile microparticles, poly(acrylonitrile-co-methacrylonitrile) nanoparticles and microparticles, poly(acrylonitrile-co-methacrylonitrile) microparticles coated with calcium carbonate, Poly(acrylonitrile-co-vinylidene chloride-co-methylmethacrylate), cationic exchange resin, anionic exchange resin, poly(1-vinylpyrrolidone-co-2-dimethylaminoethyl methacrylate), poly(vinyl pyridine), combinations of these polymers, and their reaction products with aluminum chloride and other metal compounds.

7. The method of claim 1, wherein said inorganic additives are selected from the group consisting of aluminum chloride, ferric chloride, calcium chloride, magnesium sulfate, copper sulfate, silver chloride, silver nitrate, calcium sulfate, nickel sulfate, nickel chloride, palladium oxide, platinum (IV) oxide, platinum (II) iodide, cobalt oxide, molybdenum oxide, tungsten oxide, sodium chloride, sodium hydroxide, lithium chloride, and combinations thereof.

8. The method of claim 1, wherein said monomers in solution A are selected from the group consisting of 1,2-diamino ethane, 1,6-diamino hexane, 1,2-phenylenediamine, 1,4-phenylenediamine, 1,3-phenylenediamene, piperazene, 1,2-diaminocyclohexane, 3,4-diaminobenzhyhydrozide, 3,3'-diaminobenzidine, 2,4-diamino-6-(4-chlorophenyl)-1,3,5-triazine, 2,4-diamino-6-(4-bromophenyl)-1,3,5-triazine, 2,6-diamino-4-chloropyrimidine, 2,3-diamin-5-bromopyridine, 2,4-diamino-6-(3,5-difluorophenyl)-1,3,5-triazine, 2,4-diamino-6-(2-fluorophenyl)-1,3,5-triazine, 2,7-diaminofluorene, 5,6-diamino-1,3-dimethyluracil hydrate, 4,5-diamin-2,6-dimercaptopyrimidine, 4,5-diamin-6-hydroxy-2-merptopyrimidine, 2,4-diamino-6-(hydroxymethyl) pteridine, 1,8-diamino-p-methane, 1,5-diaminonaphthalene, 9,10-diaminophenanthrene, 3,8-diamino-6-phenylphenathridine, 2,6-diaminopurine, 2,6-diaminopyridine, 2,3-diaminopyridine, 3,5-diamino-1,2,4-triazole, DL-2,3-diaminopropionic acid monohydrochloride, and combinations thereof.

9. The method of claim 1, wherein said monomers in solution B are selected from the group consisting of cyanuric chloride, cyanuric fluoride, trichloroisocyanuric acid, trimesic acid trichloride, isophthaloyl chloride, phthaloyl chloride, terephthaloyl chloride, benzene-1,3-disulfonyl chloride, 1,4-phenylenediacryloyl chloride, 1,3-phenelene diisocyanate, 1,4-phenylene diisocyanate, and combinations thereof.

10. The method of claim 1, wherein said solvents are selected from the group consisting of acetone, methylethylketone, tetrahydrofuran, 1-methyl-2-pyrrolidinone, 5-methyl-2-pyrrolidinone, dimethylformamide, dimethylacetamide, diethylformamide, diethylacetamide, trimethyl phosphate, dimethyl sulfone, 2,4-dimethyl sulfolane, sulfolane, other aprotic and combinations thereof.

* * * * *